US 6,565,716 B1

(12) United States Patent
Ruan et al.

(10) Patent No.: US 6,565,716 B1
(45) Date of Patent: May 20, 2003

(54) DIELECTRIC BARRIER DISCHARGE SYSTEM AND METHOD FOR DECOMPOSING HAZARDOUS COMPOUNDS IN FLUIDS

(75) Inventors: R. Roger Ruan, Arden Hills, MN (US); Paul L. Chen, Roseville, MN (US); Anrong Ning, Tianjin (CN); Richard L. Bogaard, Park Rapids, MN (US); Donald G. Robinson, Casselton, ND (US); Shaobo Deng, St. Paul, MN (US); Hongbin Ma, St. Paul, MN (US); Chuanshuang Bie, St. Paul, MN (US)

(73) Assignees: Regents of The University of Minnesota, Minneapolis, MN (US); R.D. Offutt Company, Park Rapids, MN (US)

( * ) Notice: Subject to any disclaimer, the term of this patent is extended or adjusted under 35 U.S.C. 154(b) by 0 days.

(21) Appl. No.: 09/690,688

(22) Filed: Oct. 17, 2000

Related U.S. Application Data

(62) Division of application No. 09/257,545, filed on Feb. 24, 1999, now Pat. No. 6,146,599.

(51) Int. Cl.[7] .............................. H05E 3/00; C07C 1/00; C01B 13/10; B01J 19/08

(52) U.S. Cl. ..................... 204/165; 204/168; 204/170; 204/176; 422/186.04; 422/186.07; 422/186.1

(58) Field of Search .................................. 204/176, 168, 204/165, 170; 422/186, 186.03, 186.04, 186.07, 186.1

(56) References Cited

U.S. PATENT DOCUMENTS

| 2,345,798 A | 4/1944 | Daily |
| 3,865,733 A | 2/1975 | Taylor ........................ 250/532 |
| 3,898,468 A | 8/1975 | Guerin ........................ 250/535 |
| 3,970,905 A | 7/1976 | Itoh et al. ................ 317/262 E |
| 4,244,712 A | 1/1981 | Tongret ....................... 55/124 |
| 4,391,773 A | 7/1983 | Flanagan ...................... 422/22 |
| 4,863,701 A | 9/1989 | McMurray ............. 422/186.08 |
| 5,304,486 A | 4/1994 | Chang ......................... 435/287 |
| 5,370,846 A | 12/1994 | Tokomi et al. ........ 422/186.07 |
| 5,411,713 A | * 5/1995 | Iwanaga ..................... 204/176 |
| 5,427,747 A | 6/1995 | Kong et al. ................. 422/186 |
| 5,458,748 A | 10/1995 | Breault et al. .............. 204/177 |
| 5,516,493 A | 5/1996 | Bell et al. .............. 422/186.07 |
| 5,549,874 A | 8/1996 | Kamiya et al. ........ 422/186.04 |
| 5,603,893 A | 2/1997 | Gundersen et al. ........... 422/22 |
| 5,637,198 A | 6/1997 | Breault ....................... 204/165 |
| 5,670,122 A | 9/1997 | Zamansky et al. .......... 423/210 |
| 5,681,533 A | 10/1997 | Hiromi ....................... 422/121 |
| 5,695,619 A | 12/1997 | Williamson et al. ........ 204/165 |
| 5,711,147 A | 1/1998 | Vogtlin et al. ................ 60/274 |

(List continued on next page.)

FOREIGN PATENT DOCUMENTS

| EP | 1495286 A | 7/1989 |
| GB | 2316017 | 2/1998 |
| JP | 59-69404 | 4/1984 |
| RU | XP-002140238 | 11/1996 |
| WO | 980342 | 1/1998 |

*Primary Examiner*—James J. Seidleck
*Assistant Examiner*—Thao Tran
(74) *Attorney, Agent, or Firm*—Westman, Champlin & Kelly

(57) ABSTRACT

A dielectric barrier discharge system includes first and second non-thermal plasma reactors which are coupled together in series. The first reactor includes a first surface discharge electrode which defines a first discharge path along the first surface discharge electrode. The second reactor includes second and third electrodes which are separated by a gap and define a second discharge path which extends across the gap. The system can be used to decompose hazardous compounds in a liquid or a gas, such as in power plant flue gases.

18 Claims, 9 Drawing Sheets

U.S. PATENT DOCUMENTS

| | | | |
|---|---|---|---|
| 5,746,984 A | 5/1998 | Hoard | 422/169 |
| 5,750,823 A | 5/1998 | Wofford et al. | 588/210 |
| 5,759,497 A | 6/1998 | Kuzumoto et al. | 422/186.07 |
| 5,822,981 A | 10/1998 | Williamson et al. | 60/275 |
| 5,827,407 A | 10/1998 | Wang et al. | 204/164 |
| 5,836,154 A * | 11/1998 | Williamson et al. | 204/164 |
| 5,843,288 A | 12/1998 | Yamamoto | 204/164 |
| 5,843,383 A | 12/1998 | Williamson et al. | 422/186.04 |
| 5,855,855 A | 1/1999 | Williamson et al. | 422/186.04 |
| 5,871,703 A | 2/1999 | Alix et al. | 423/219 |
| 5,891,409 A | 4/1999 | Hsiao et al. | 423/239.1 |
| 5,893,267 A | 4/1999 | Vogtlin et al. | 60/274 |
| 5,895,558 A | 4/1999 | Spence | 204/164 |
| 5,895,632 A | 4/1999 | Nomura et al. | 422/186.04 |
| 5,904,905 A | 5/1999 | Dolezal et al. | 422/186.04 |
| 6,146,599 A | 11/2000 | Ruan et al. | 422/186.04 |

* cited by examiner

DIELECTRIC BARRIER DISCHARGE SYSTEM AND METHOD FOR DECOMPOSING HAZARDOUS COMPOUNDS IN FLUIDS

CROSS-REFERENCE TO RELATED APPLICATION

This is a division of U.S. Ser. No. 09/257,545, filed Feb. 24, 1999, now U.S. Pat. No. 6,146,599 and entitled "DIELECTRIC BARRIER DISCHARGE SYSTEM AND METHOD FOR DECOMPOSING HAZARDOUS COMPOUNDS IN FLUIDS".

BACKGROUND OF THE INVENTION

The present invention relates to non-thermal plasma reactors and more particularly to a dielectric barrier discharge system for decomposing hazardous compounds in a liquid or a gas.

Certain compounds including sulfur oxides, nitrogen oxides and carbon monoxide in power plant flue gases must be controlled to meet stringent government emission regulations. These compounds are either toxic or are precursors to acid rain deposition and photochemical smog. The industry has devoted considerable effort to develop a variety of technologies to reduce the pollutant emissions from the exhaust stream of combustion processes. However these technologies have substantial disadvantages and more effective and economical measures are needed.

Plasma is regarded as the fourth state of matter (ionized state of matter). Unlike thermal plasmas, non-thermal plasmas (NTPs) are in gaseous media at near-ambient temperature and pressure but have electron mean energies considerably higher than other gaseous species in the ambient environment. NTP species include electrically neutral gas molecules, charged particles in the form of positive ions, negative ions, free radicals and electrons, and quanta of electromagnetic radiation (photons). These NTP species are highly reactive and can convert hazardous gases to non-hazardous or less hazardous and easily-managed compounds through various chemical reaction mechanisms. In contrast to thermal processes (such as thermal plasma), an NTP process directs electrical energy to induce favorable gas chemical reactions, rather than using the energy to heat the gas. Therefore, NTP is much more energy-efficient than thermal plasma.

NTPs can be generated by electric discharge in the gas or injection of electrons into the gas by an electron beam. Electron beams must be accelerated under a high vacuum and then transferred through special windows to the reaction site. The reaction site must be sized with respect to the penetration depth of the electrons. It is much more difficult to scale-up the size of an electron beam reactor than an electric discharge reactors. Therefore, electron beam reactors are less favored than electric discharge reactors.

Among the various types of electric discharge reactors, pulse corona and dielectric barrier (silent) discharge reactors are very popular for their effectiveness and efficiency. However, pulse corona reactors have the major disadvantage of requiring special pulsed power supplies to initiate and terminate the pulsed corona. Consequently, dielectric barrier discharge has become a fast growing technology for pollution control.

Cylindrical and planar reactors are two common dielectric barrier discharge reactor configurations. Both of these configurations are characterized by the presence of one or more insulating layers in a current path between two metal electrodes, in addition to the discharge space. Other dielectric barrier discharge reactors include packed-bed discharge reactors, glow discharge reactors, and surface discharge reactors.

There are several major difficulties in the practical use of dielectric barrier discharge reactors for hazardous gas removal. These difficulties include an expensive power supply, a low energy efficiency and flow rate, and the blocking of discharge volume by dusts in the feed gas and/or solid mineral compounds produced during the plasma reactions. More effective and economical dielectric barrier discharge reactors are desired.

SUMMARY OF THE INVENTION

One aspect of the present invention relates to a dielectric barrier discharge system which includes first and second non-thermal plasma reactors that are coupled together in series. The first reactor includes a first surface discharge electrode which defines a first discharge path along the first surface discharge electrode. The second reactor includes second and third electrodes which are separated by a gap and define a second discharge path which extends across the gap.

Another aspect of the present invention relates to a dielectric barrier discharge system for treating a fluid comprising dust, sulphur oxide and nitrogen oxide. The system includes a pretreatment non-thermal plasma reactor and a main non-thermal plasma reactor. The pretreatment non-thermal plasma reactor has a surface discharge electrode for producing a surface plasma in the fluid along the surface discharge electrode. The surface plasma removes a first portion of the dust and decomposes a first portion of the sulphur oxide and nitrogen oxide. The main non-thermal plasma reactor is coupled to the pretreatment non-thermal plasma reactor and has oppositely polarized electrodes which are separated by a gap. The oppositely polarized electrodes produce a plasma in the fluid across the gap which removes a second portion of the dust and decomposes a second portion of the sulphur oxide and nitrogen oxide.

Another aspect of the present invention relates to a method of decomposing a compound in a fluid. The method includes: passing the fluid along a first surface discharge electrode in a pretreatment non-thermal plasma reactor; electrically exciting the first surface discharge electrode to generate a first surface plasma in the fluid along the first surface discharge electrode; passing the fluid through a gap between second and third oppositely polarized electrodes in a main non-thermal plasma reactor; and electrically exciting the second and third oppositely polarized electrodes to generate a second plasma in the fluid across the gap.

DETAILED DESCRIPTION OF THE PREFERRED EMBODIMENTS

Figure 1:
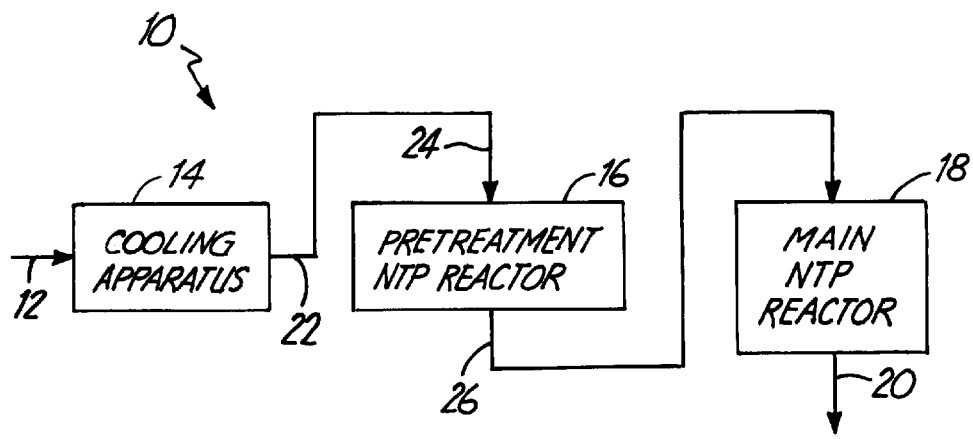
FIG. 1 is a block diagram of a dielectric barrier discharge system, according to one embodiment of the present invention.

FIG. 1 is a block diagram of a dielectric barrier discharge system according to one embodiment of the present invention for removing hazardous compounds from a fluid using non-thermal plasma (NTP) techniques. The fluid can include a liquid or a gas. For example, system 10 can be used to remove certain compounds, such as sulpher oxides, nitrogen oxides and carbon monoxide, from power plant flue gases. These compounds are either toxic or precursors to acid rain deposition and photochemical smog.

System 10 includes fluid inlet 12, cooling apparatus 14, pretreatment NTP reactor 16, main NTP reactor 18 and fluid outlet 20. Pretreatment NTP reactor 16 is a "surface discharge" type of reactor which has one or more electrodes that produce surface plasma along the surfaces of the electrodes. In contrast, main NTP reactor 18 is a "silent" type of reactor which has two or more parallel electrodes that produce various plasma species across a gap between the electrodes. The NTP process in reactors 16 and 18 directs electrical energy to induce favorable chemical reactions in the flue gas which convert the hazardous compounds to non-hazardous and more easily-managed compounds. The combination of pretreatment NTP reactor 16 and main NTP reactor 18 provides a system for decomposing these hazardous compounds which does not require an expensive power supply, has a high energy efficiency and flow rate and avoids blockage of the flow paths through the reactors from dust in,the feed gas or solid mineral compounds produced during the plasma reactions.

When treating high temperature fluids, such as post-combustion flue gases, system 10 includes cooling apparatus 14 for cooling the gases to a desired temperature before the gases are passed to reactors 16 and 18. In low temperature applications, cooling apparatus 14 is not needed. Cooling apparatus 14 can include any suitable cooling device such as an air or liquid heat exchanger, depending upon the particular fluid being cooled.

The cooled flue gas exits cooling apparatus 14 through outlet 22 and is passed to inlet 24 of NTP reactor 16, where the gas is pretreated to remove dusts and to partially remove, or decompose. Sulphur oxides, nitrogen oxides and carbon monoxides from the gas. The pretreated gas is then passed from outlet 26 to inlet 28 of main NTP reactor 18, where the remaining sulphur nitrogen oxides and carbon monoxides are decomposed. The final, treated gas exits reactor 18 through fluid outlet 20.

Figure 2:
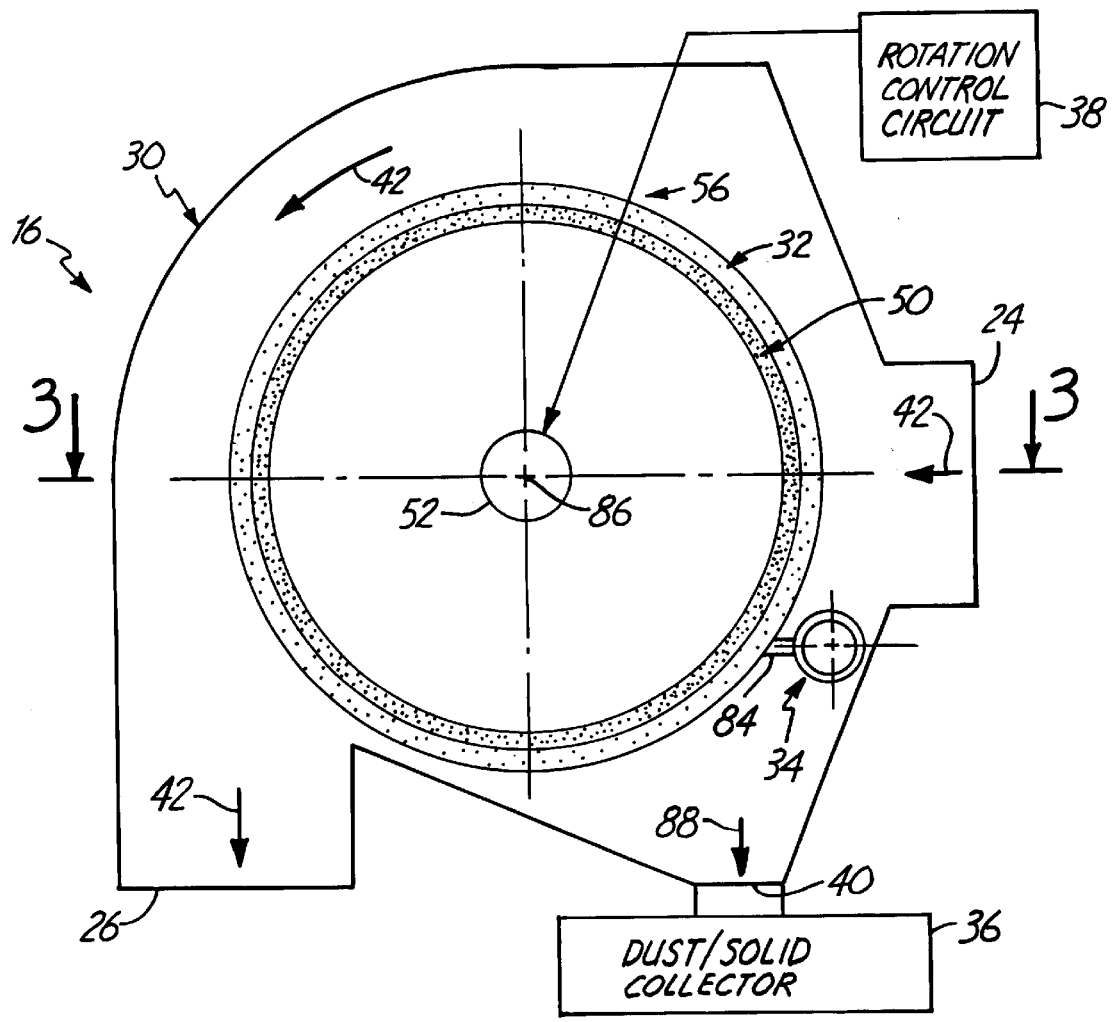
FIG. 2 is a side view of a pretreatment NTP reactor in the system shown in FIG. 1, according to one embodiment of the present invention.

FIG. 2 is a side view of NTP reactor 16 which shows the reactor in more detail, according to one embodiment of the present invention. NTP reactor 16 includes housing 30, surface discharge electrode 32, dust scrubber 34, dust/solid collector 36 and rotation control circuit 38. Housing 30 includes fluid inlet 24, fluid outlet 26 and dust outlet 40. Gas flows from fluid inlet 24 to fluid outlet 26 in the direction of arrows 42 and passes between electrode 3.2 and the inner wall of housing 30. Electrode 32 is supported on an outer diameter of tubular electrode support 50, which is mounted on a central shaft 52. Electrode 32 defines a reaction volume 56 along the surface of the electrode.

Figure 3:
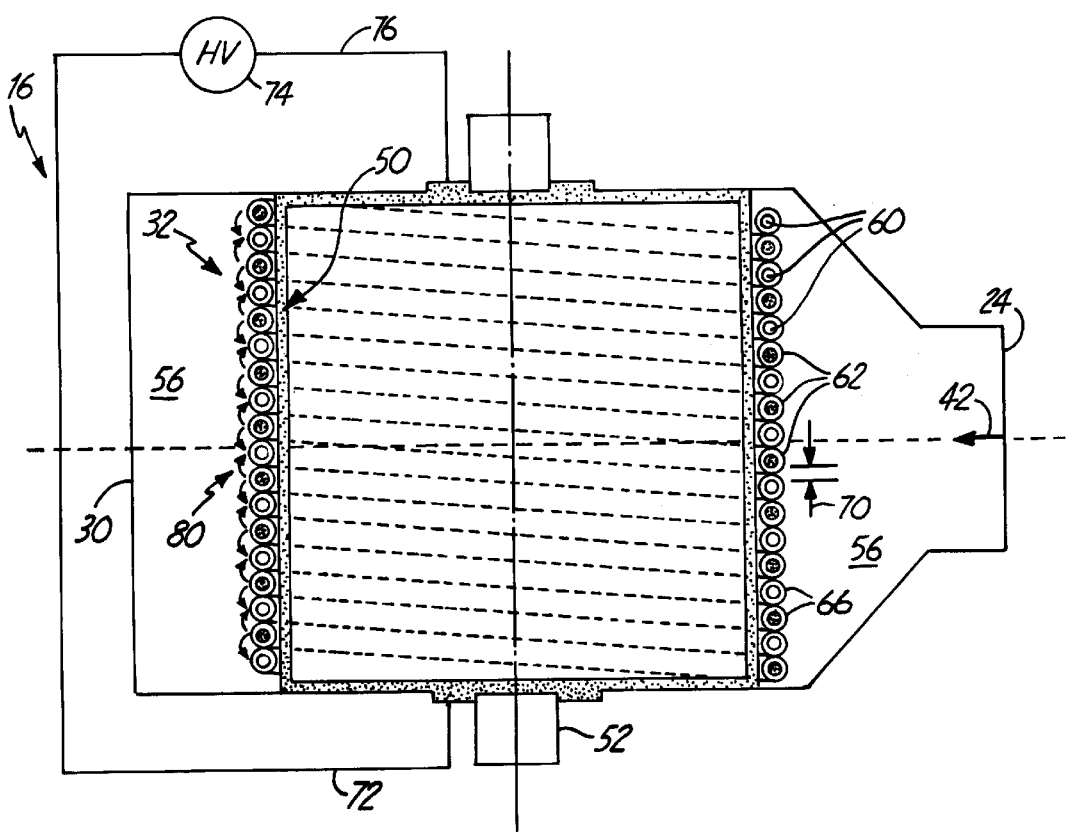
FIG. 3 is a schematic, sectional view of the pretreatment NTP reactor taken along lines 3—3 of FIG. 2.

Electrode 32 is shown in greater detail in FIG. 3 which is a schematic, sectional view of NTP reactor 16 taken along lines 3—3 of FIG. 2. Electrode 32 includes elongated conductors 60 and 62 which are wound together around the outer diameter of tubular support 50 to form a helical winding. Conductors 60 and 62 are electrically insulated from one another and are wound such that adjacent conductors have opposite polarity. In the embodiment shown in FIG. 3, conductors 60 and 62 are each individually coated with a dielectric material 66 that forms an electrically insulating sheath. Conductors 60 and 62 may alternatively be embedded in a dielectric material. The dielectric material used to insulate conductors 60 and 62 can include glass, ceramic, quartz, Teflon or epoxy, for example. Conductors 60 and 62 preferably have diameters ranging from 0.1 to 3.0 mm. The dielectric material preferably has a thickness in the range of 0.05 to 3 mm. Conductors 60 and 62 are preferably separated by a gap 70 in the range of zero to 6 mm, for example.

Conductor 60 is electrically coupled to terminal 72 of high voltage power supply 74. Conductor 62 is electrically coupled to terminal 76 of power supply 74. Power supply 74 can include a direct-current (DC) or preferably an alternating-current (AC) power-supply that is capable of producing a voltage across terminals 72 and 76 in the range of 1–15 kV.

Excitation of conductors 60 and 62 by power supply 74 generates micro current discharge paths 80 in reaction volume along the surface of electrode 32. Electric discharge through discharge paths 80 generate non-thermal surface plasma species within the flue gas the surface of electrode 32. The surface plasma species includes electrically neutral gas molecules, charged particles in the form of positive ions, negative ions, free radicals and electrons, and quanta of electromagnetic radiation (photons). These non-thermal plasma species are highly reactive and convert the hazardous sulphur oxides, nitrogen oxides and carbon monoxide in the gas to non-hazardous or less hazardous and easily managed compounds through various chemical is reaction mechanisms.

Excitation of conductors 60 and 62 also assists in precipitating dust particles from the flue gas by polarizing and attracting the particles by electrostatic attraction to the surface of electrode 32. The dust particles that are attracted to the surface of electrode 32 can then be removed in a variety of ways. For example, referring back to FIG. 2, the attracted dust particles can be scrubbed from the surface of electrode 32 with dust scrubber 34. Dust scrubber 34 includes a brush or scrapper 84 which contacts the outer diameter of electrode 32.

Tubular electrode support 50 is rotatable with shaft 52 about central axis 86. Rotation circuit 38 is connected to shaft 52. Rotation control circuit 38 controls the rotation and can include a typical motor and control circuit. Rotation of tubular electrode support 50 moves electrode 32 relative to dust scrubber 34. As electrode 32 moves, brush 84 lifts the attracted dust and other solid or liquid by-products from the surface of electrode 32, allowing these by-products to fall in the direction of arrow 88. The falling by-products exit housing 30 through dust outlet 40, where they can be collected by dust/solid compound collector 36. NTP reactor 16 therefore pretreats the flue gas by partially removing sulphur oxides, nitrogen oxides, carbon monoxide and dust from the flue gas simultaneously. The dust and/or solid mineral compounds produced during the plasma reactions are removed without allowing these compounds to block flow path 42.

Figure 4:
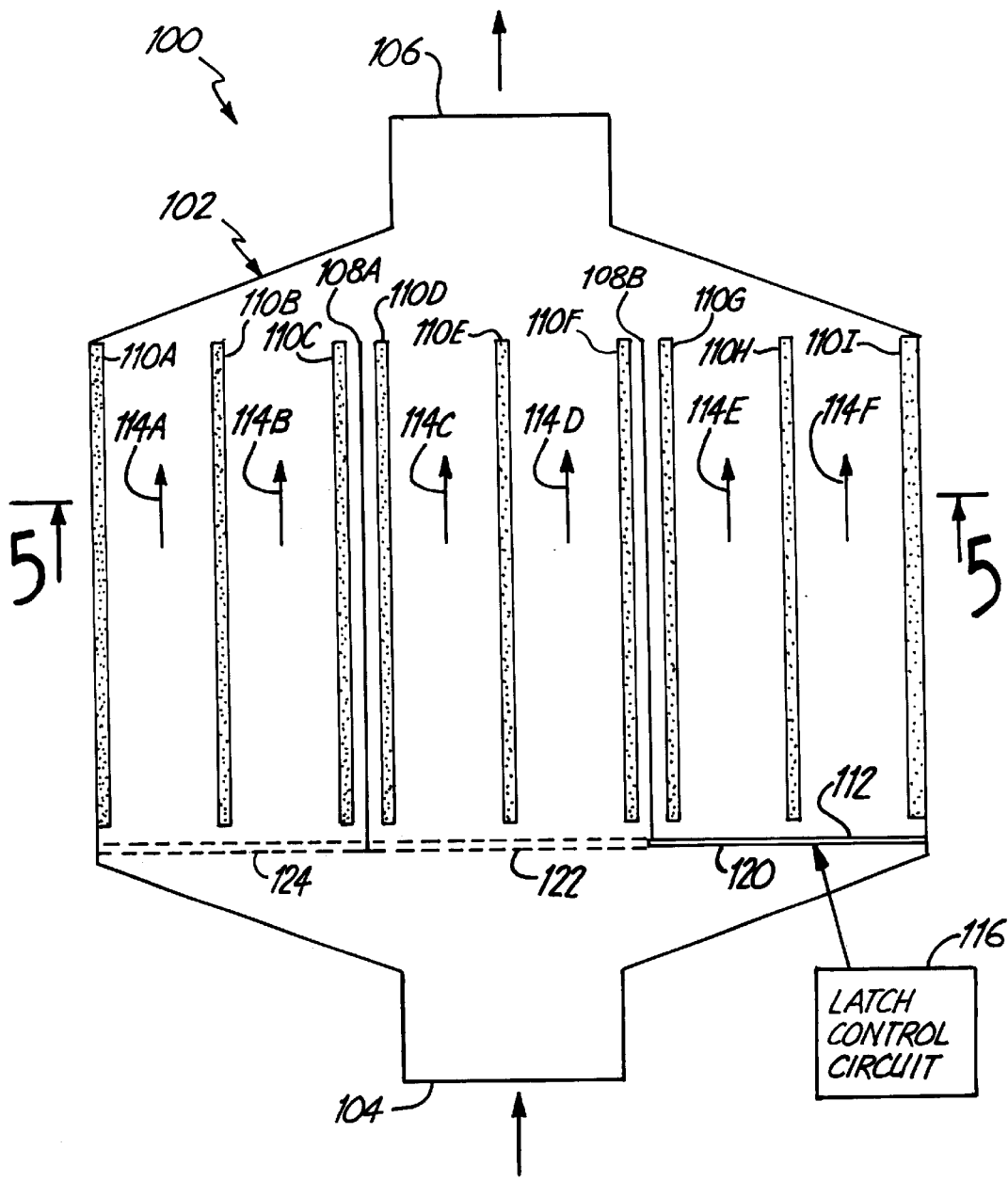
FIG. 4 is a top plan view of an alternative pretreatment NTP reactor that can be used in the system shown in FIG. 1.

FIG. 4 is a top plan view of an alternative pretreatment NTP reactor which can be substituted for or used in addition to reactor 16 shown in FIGS. 1–3. Reactor 100 includes housing 102, fluid inlet 104, fluid outlet 106, vertical interior walls 108A and 108B, planar surface discharge electrodes 110A–110I and sliding latch 112. Surface discharge electrodes 110A–110I extend vertically within housing 102 and define a plurality of flow paths 114A–114F between respective pairs of the electrodes. With a large number of flow paths, reactor 100 has a relatively high flow rate. For example, flue gas may travel through reactor at a velocity of 0–10 meters per second (m/s).

Electrodes 110A–110I operate in a similar manner as electrode 32 in the embodiment shown in FIG. 3 for removing dusts and partially removing sulphur oxides, nitrogen oxides and carbon monoxide from the flue gas. Each electrode 110A–110I is electrically coupled to a high voltage power supply similar to power supply 74 shown in FIG. 3. Excitation of each electrode generates a surface plasma along the surface of each electrode within flow paths 114A–114F.

The solid mineral compounds produced during the plasma reactions and the dust collected on the surfaces of electrodes 110A–110I are periodically ejected from the surfaces by temporarily increasing the voltage applied to each electrode. For example, if electrodes 110A–110I are normally excited to a voltage of 5 kV, suddenly increasing the voltage to a higher voltage such as 9 kV will eject the dust and other solid compounds collected on the surfaces of electrodes 110A–110I. In the embodiment shown in FIG. 3, electrode 32 is optimized for attracting dusts of 0–3 mm in diameter. The dust and other solid compounds precipitated in flow paths 114E and 114F fall due to the action of gravity through a dust outlet in a bottom surface of housing 102 which is described in more detail below with reference to FIG. 5.

To prevent the ejected particles and compounds from being passed through outlet 106, sliding latch 112 is used to block selected ones of the flow paths 114A–114F while the corresponding electrodes are increased to a higher voltage level. In the embodiment shown in FIG. 4, latch 112 has three selectable positions 120, 122 and 124 (122 and 124 shown in phantom). Movement of latch 112 is controlled by latch control circuit 116. In position 120, latch 112 blocks flow paths 114E and 114F and unblocks flow paths 114A–114D. When latch 112 is in position 120, electrodes 110G–110I are increased to a higher voltage level while electrodes 110A–110F remain at the normal operating voltage level. When latch 112 is in position 122, latch 112 blocks flow paths 114C and 114D and unblocks flow paths 114A, 114B, 114E and 114F. When latch 112 is in position 124, latch 112 blocks flow paths 114A and 114B and unblocks flow paths 114C–114F.

Figure 5:
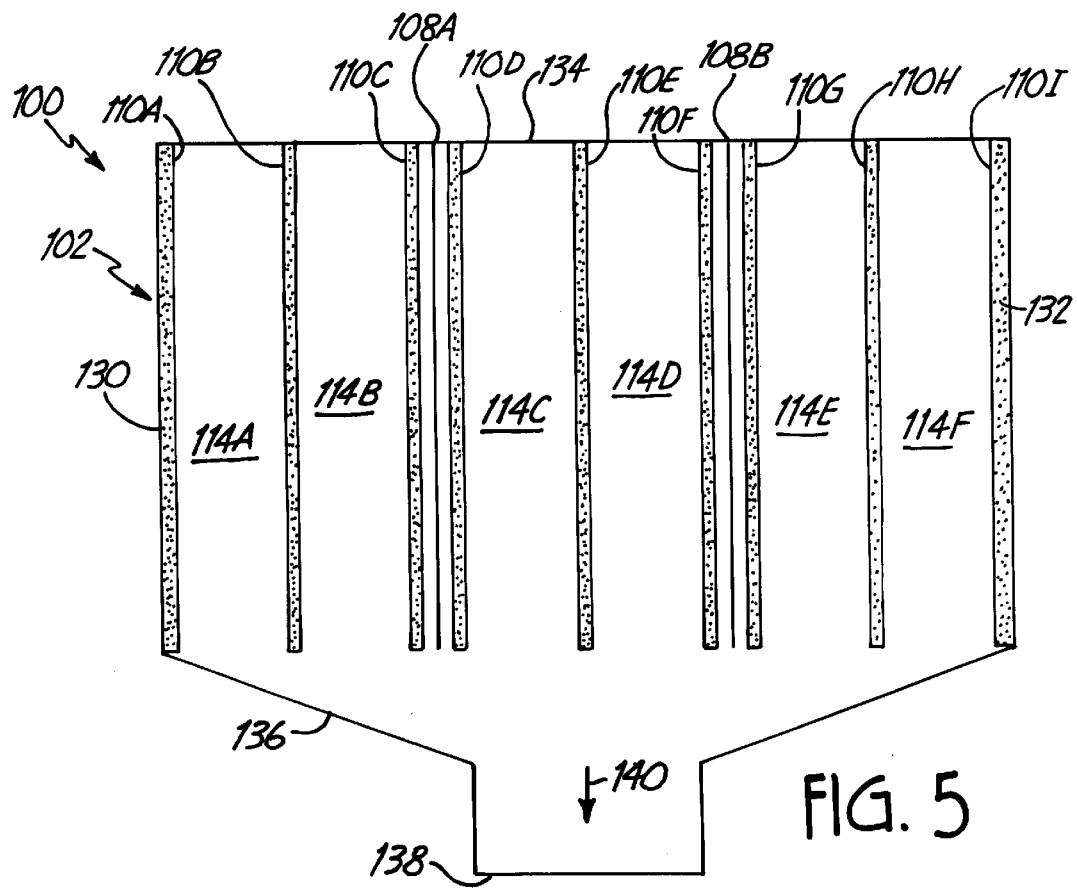
FIG. 5 is a side sectional view of the reactor shown in FIG. 4, taken along lines 5—5 of FIG. 4.

FIG. 5 is a side, cross-sectional view of NTP reactor 100 taken along lines 5—5 of FIG. 4. Housing 102 includes side surfaces 130 and 132, top surface 134 and bottom surface 136. Bottom surface 136 is angled downward toward dust outlet 138 such that the precipitated dust and other solid compounds are directed to dust outlet 138 in the direction of arrow 140 as the fall from flow paths 114A–114F.

Figure 6:
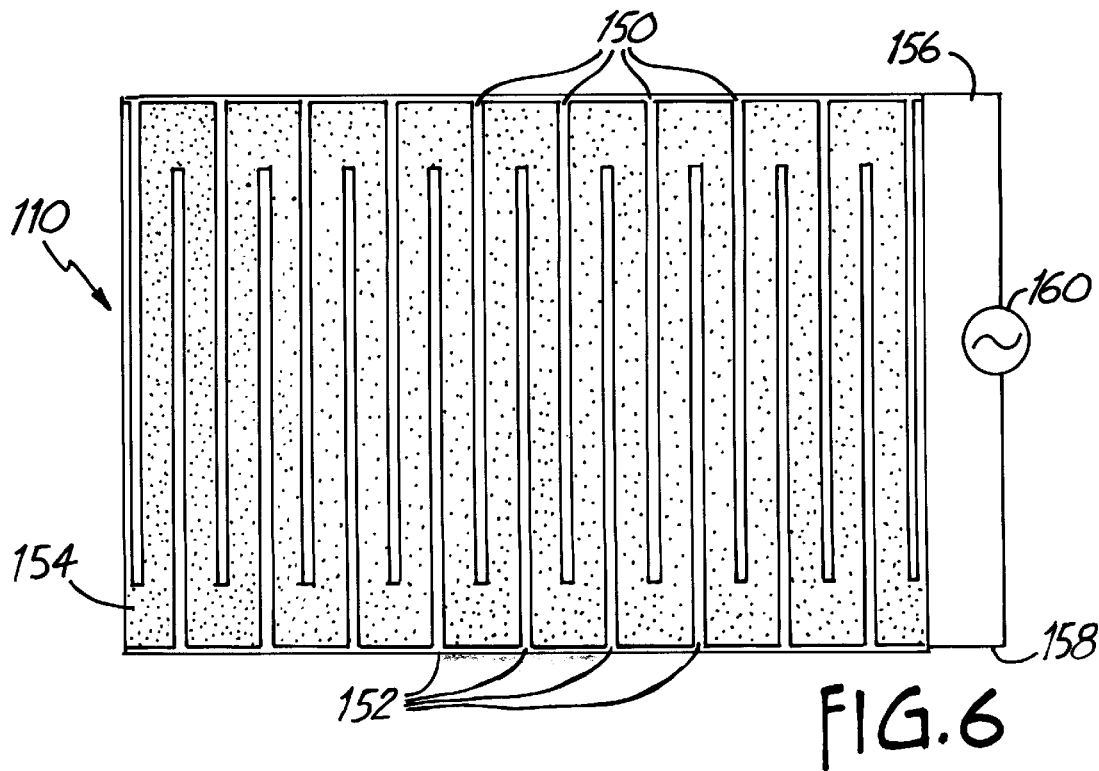
FIG. 6 is a side view of a surface discharge electrode used in the reactor shown in FIGS. 4 and 5.

FIG. 6 is a side view of one of the planar surface discharge electrodes 110A–110I shown in FIGS. 4 and 5. Electrode 110 includes an electrode panel formed of a plurality of conductors 150 and 152 which are embedded in a dielectric material 154. Conductors 150 are electrically coupled to terminal 156 of power supply 160, and conductors 152 are electrically coupled to terminal 158 of power supply 160. Power supply 160 is preferably a high voltage AC power supply similar to that discussed with respect to FIG. 3.

Conductors 150 and 152 are arranged so that adjacent conductors have opposite polarity. Dielectric material 154 provides structural support for conductors 150 and 152. Electrode 110 can have a variety of shapes in alternative embodiments. The size of conductors 150 and 152, the spacing between the conductors, the spacing between the electrode plates and the applied voltage and frequency can be varied as desired to attract or decompose compounds of particular sizes. In one embodiment, conductors 150 and 152 and dielectric material 154 have the same properties as those discussed with reference to electrode 32 with reference to FIG. 3.

Figure 7:
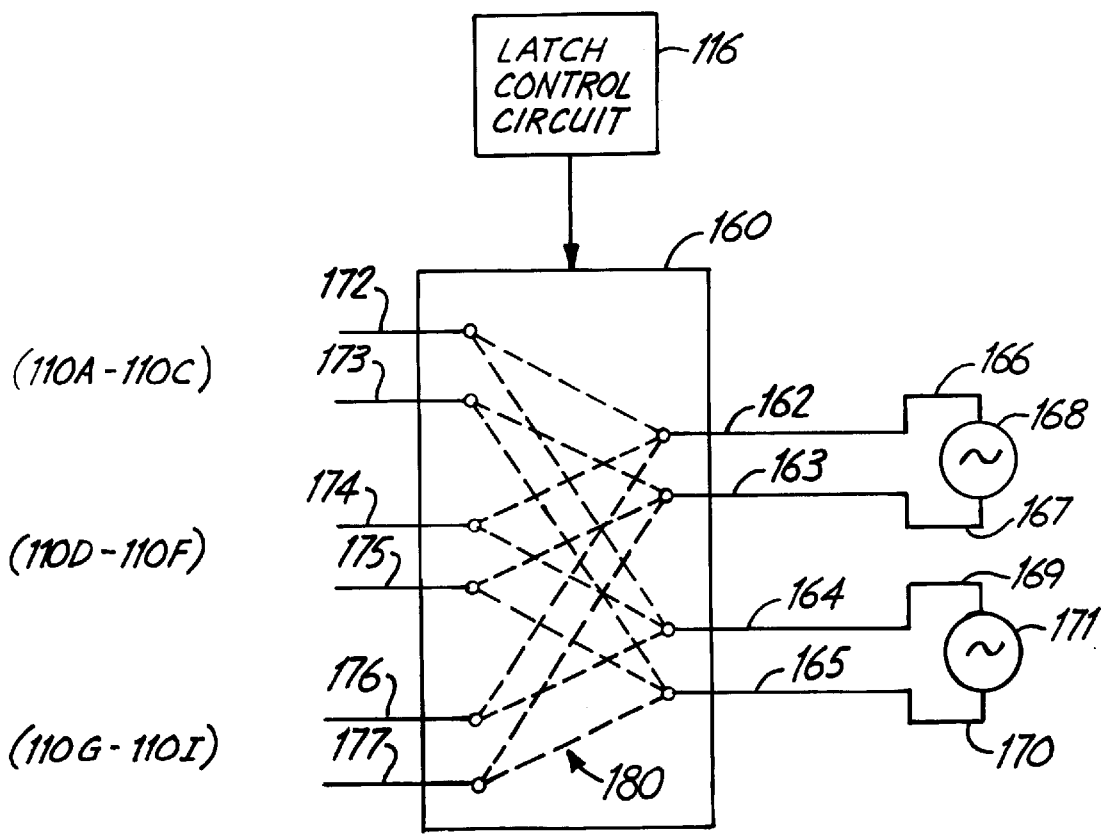
FIG. 7 is a schematic diagram of a switching circuit used in the reactor shown in FIGS. 4 and 5.

FIG. 7 is a schematic diagram of a switching circuit which is used for temporarily increasing the voltage levels applied to electrodes 110A–110I (shown in FIG. 4) in conjunction with the operation of latch 112. Switching circuit 160 includes inputs 162–165. Inputs 162 and 163 are electrically coupled to terminals 166 and 167 of AC source 168. Inputs 164 and 165 are electrically coupled to terminals 169 and 170 of AC source 171. AC source 171 has a higher voltage output than AC source 168. Switching circuit 160 further includes outputs 172–177. Outputs 172 and 173 are electrically coupled to electrodes 110A–110C. Outputs 174 and 175 are electrically coupled to electrodes 110D–110F. Outputs 176 and 177 are electrically coupled to electrodes 110G–110I.

Switching circuit 160 further includes a switching network 180 (shown in phantom) which electrically connects outputs 172–177 to inputs 162–165 in a selected sequence under the control of latch control circuit 116. When latch 112 is in position 120, outputs 172 and 174 are coupled to input 162, outputs 173 and 175 are coupled to input 163, output 176 is coupled to input 164, and output 177 is coupled to input 165. When latch 112 is in position 122, switching network 180 couples outputs 172 and 176 to input 162, outputs 173 and 177 to input 163, output 174 to input 164 and output 175 to input 165. When latch 112 is in position 124, switching network 180 couples output 172 to input 164, output 173 to input 165, outputs. 174 and 176 to input 162 and outputs 175 and 177 to input 163.

Referring back to FIG. 1, main NTP reactor 18 includes a series of planar reactors, wherein each planar reactor has two dielectric barriers. A space that is formed between the two dielectric barriers defines a plasma discharge volume through which the passing flue gas is treated.

Figure 8:
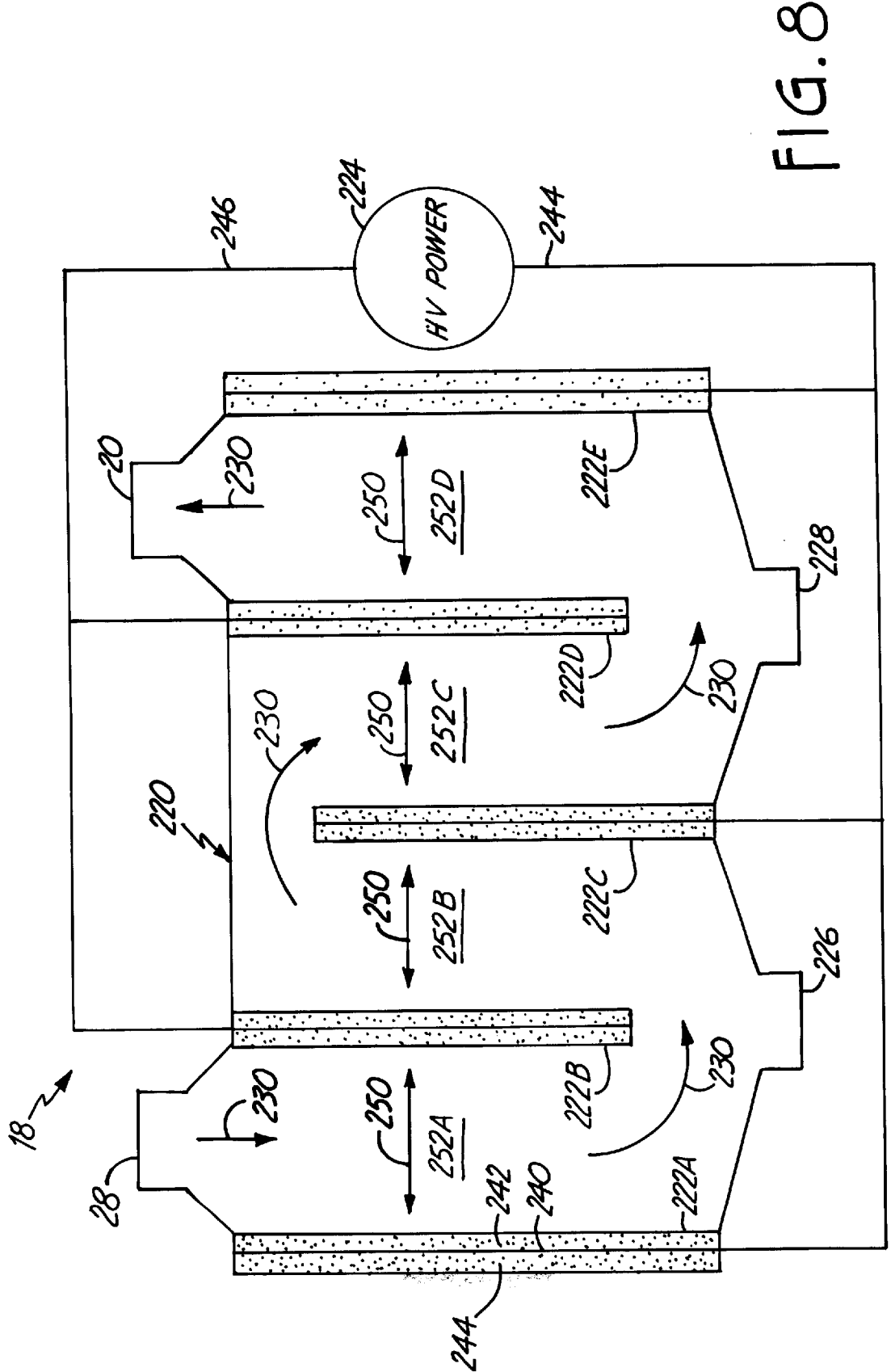
FIG. 8 is a top plan view of a main NTP reactor in the system shown in FIG. 1, according to one embodiment of the present invention.

FIG. 8 shows main NTP reactor 18 in greater detail according to one embodiment of the present invention. FIG. 8 is a top plan view of main NTP reactor 18. NTP reactor 18 includes housing 220, a plurality of parallel, planar electrode panels 222A–222E, and high voltage power source 224. Housing 220 includes fluid inlet 28, fluid outlet 20 and dust/solid compound outlets 226 and 228.

Electrode panels 222A–222E extend vertically within housing 220 and are arranged to define a winding flow path in the direction of arrows 230, from fluid inlet 28 to fluid outlet 20. Electrodes 222A–222E each include a conductor 240 such as a thin conductive plate or wire mesh which is embedded between two opposing layers of dielectric material 242 and 244. Conductor 240 can be formed of stainless steel, for example. Dielectric layers 242 and 244 can be formed of glass, quartz, ceramic, Teflon or epoxy, for example. The conductors in electrodes 222A, 222C and 222E are electrically coupled to terminal 244 of power supply 224. The conductors in electrodes 222B and 222D are electrically coupled to terminal 246 of power supply 224. Adjacent electrodes therefore have opposite polarity.

The separation between adjacent electrodes 222A–222E defines individual reaction volumes, or discharge volumes, 252A–252D which are connected together in series. In one embodiment, the separation between adjacent electrodes is 0–10 mm. With each electrode 222A–222E having opposite polarity, an electrical discharge path is formed from each electrode to its adjacent electrodes across reaction volumes 252A–252D, as shown by arrows 250. With the winding flow path, the gas (or liquid) to be treated can travel from one reaction volume to the next in series, which increases the residence time of the gas within reactor 18 without significantly increasing the size of the system. The winding flow path passes successively over and then under adjacent ones of the electrodes 222B–222D. Specifically, the flow path passes down reaction volume 252A, under electrode 222B, up reaction volume 225B, over electrode 222C, down reaction volume 252C, under electrode 222D and up reaction volume 252D.

Dust/solid compound outlet 226 is positioned below reaction volumes 252A and 252B. Similarly, dust/solid compound outlet 228 is positioned below reaction volumes 252C and 252D. Outlets 226 and 228 allow dust and other solid or liquid by-products produced during the plasma reactions to be collected so that these compounds will not be released to the atmosphere through fluid outlet 20. As these by-products are produced, the by-products fall toward the lower surface of housing 220, which is angled to direct the by-produces through outlets 226 and 228.

Figure 9:
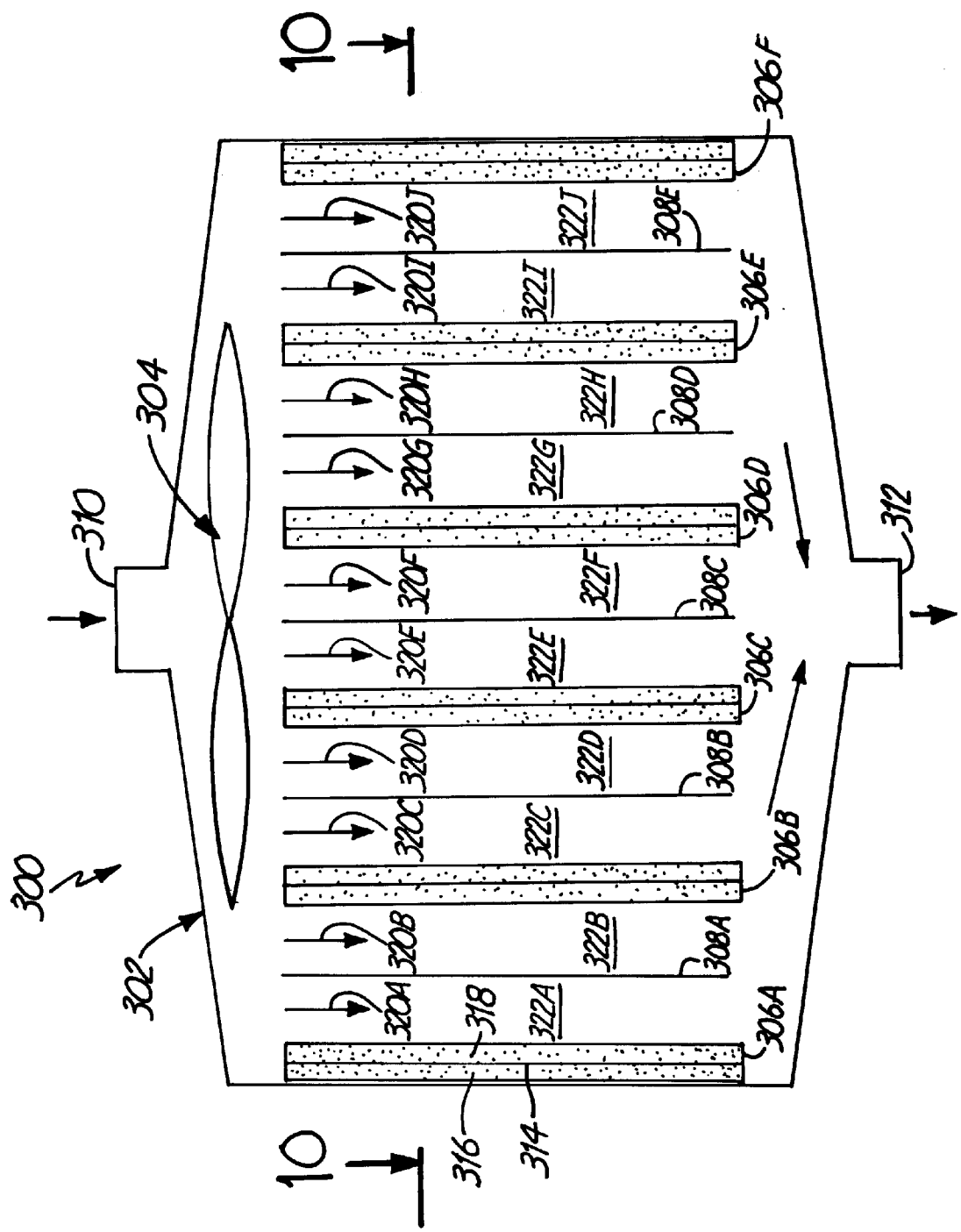
FIG. 9 is a side sectional view of an alternative main NTP reactor that can be used in the system shown in FIG. 1.

FIG. 9 is a side sectional view of a main NTP reactor according to an alternative embodiment of the present invention. Main NTP reactor 300 can be substituted for or used with NTP reactor 18 shown in FIGS. 1 and 8. NTP reactor 300 includes housing 302, fan 304, high voltage electrode panels 306A–306F and ground, or earth, electrodes 308A–308E. Housing 302 includes fluid inlet 310 and fluid outlet 312. Each of the high voltage electrode panels 306A–306F includes a conductor 314 such as a thin conductive plate or wire mesh which is embedded between two opposing layers of dielectric material 314 and 316. Conductor 314 can be formed of stainless steel, for example. Dielectric layers 316 and 318 can be formed of glass, quartz, ceramic, Teflon or epoxy, for example.

Electrodes 306A–306F and 308A–308E are arranged vertically in housing 302 to define a plurality of flow paths 320A–320J between respective pairs of the electrodes. The gaps between high voltage electrodes 306A–306F and the respective ground electrodes 308A–308E define individual reaction volumes 320A–320J within flow paths 320A–320J. These gaps are preferably 0–10 mm, for example, as measured from each of the conductors 314 to the next adjacent ground electrode 308A–308E. Fan 302 assists in maintaining flow through flow paths 320A–320J.

Figure 10:
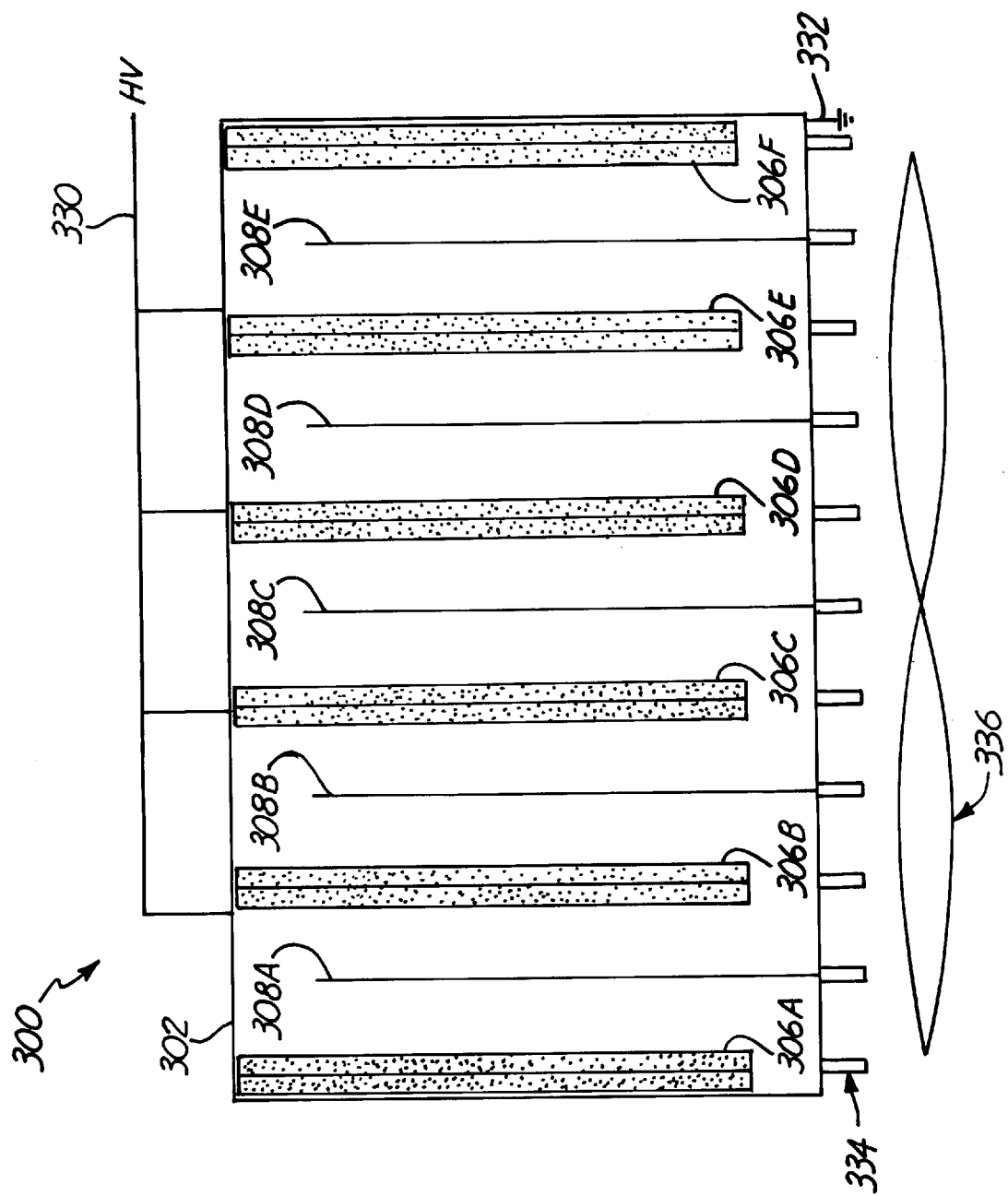
FIG. 10 is a top sectional view of the reactor shown in FIG. 9, taken along lines 10—10 of FIG. 9.

FIG. 10 is a top sectional view of main NTP reactor 300 taken along lines 10—10 of FIG. 9. High voltage electrodes 306A–306F are electrically coupled to high voltage input terminal 330. Ground electrodes 308A–308E are electrically coupled to housing 302, which is electrically conductive.

Housing 302 is electrically coupled to ground terminal 332. In embodiments in which housing 302 is non-conductive, ground electrodes 308A–308E are coupled directly to ground terminal 332. Housing 302 further includes cooling fins 334. Fan 336 is positioned adjacent cooling fins 334 for disbursing heat transferred to cooling fins 334.

Ground electrodes 308A–308E can include an electrically conductive plate or wire mesh, for example. With a wire mesh, gas can freely travel between two dielectric-embedded electrodes 306A–306F. The conductive plates or wire meshes can be formed of stainless steel, for example.

The use of ground electrodes 308A–308E allows NTP reactor 300 to be driven by a lower voltage than the embodiment shown in FIG. 8 since there is only one dielectric layer between conductors 314 and the respective ground electrodes 308A–308E. NTP reactor 18 said NTP reactor 300 are preferably driven by a high frequency, high voltage power supply. For example, the reactors can be driven by a power supply having a frequency range of 50–2000 Hz and a voltage range of 0–40 kV.

Figure 11:
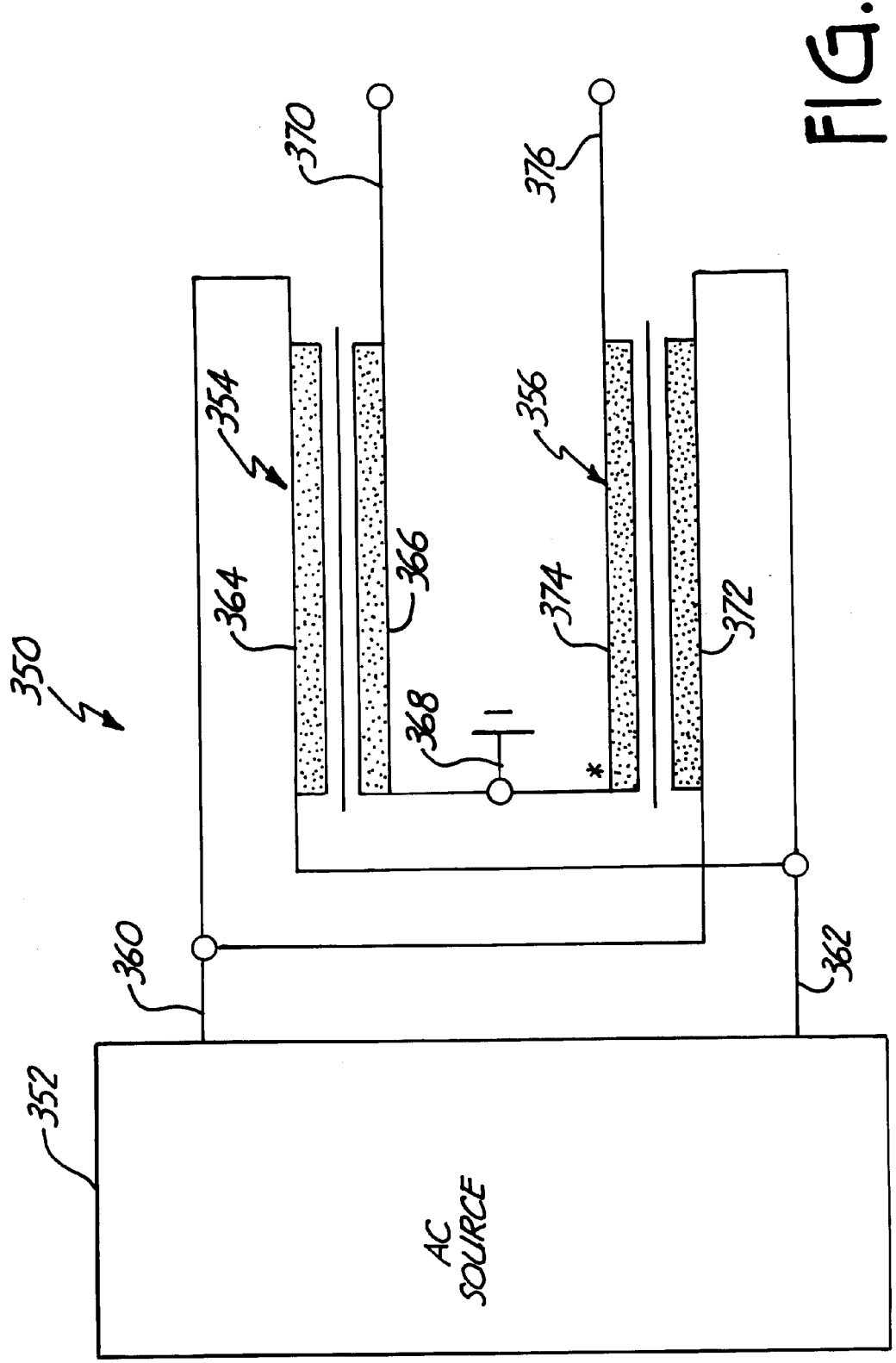
FIG. 11 is a schematic diagram of a high voltage alternating-current power supply which can be used with the reactors shown in FIGS. 2–10.

FIG. 11 is a schematic diagram of a high frequency, high voltage power supply that can be used to drive the reactors shown in FIGS. 8–10. Power supply 350 includes a AC source 352 and transformers 354 and 356. AC source 350 can include any AO source or frequency modulator having a frequency range of 50–2,000 Hz, for example. AC source 352 has output terminals 360 and 362. Transformer 350 includes primary winding 364 and secondary winding 366. Primary winding 364 is coupled between output terminals 360 and 362. Secondary winding 366 is coupled between ground terminal 368 and output terminal 370. Similarly, transformer 356 includes primary winding 372 and secondary winding 374. Primary winding 372 is coupled between output terminals 360 and 362. Secondary winding 374 is coupled between ground terminal 368 and output terminals 376.

Power source 350 is capable of generating a very large voltage across output terminals 370 and 376, such as up to 40 kV and higher. In the embodiment shown in FIG. 8, output terminals 370 and 376 would be coupled to terminals 244 and 246, respectively.

The present invention provides a low cost dielectric barrier discharge system for effective decomposition of sulphur oxides, nitrogen oxides, carbon monoxide and other hazardous gases in flue gas. The system can also be modified to decompose or convert other hazardous compounds in gases or liquids to non-hazardous and more easily manageable compounds. The individual NTP reactors used in the present invention are energy efficient and have a high flow rate. Further, the pretreatment reactor allows a portion of the dust and hazardous compounds to be removed from the removed from the flue gas the gas enters the main NTP reactor. Structural features in each reactor allow the dust and other by-products that are produced during the plasma reactions to be removed easily without clogging the reactor flow paths. Another advantage of the present invention is that the reactors can be driven by a low-cost power supply.

Although the present invention has been described with reference to preferred embodiments, workers skilled in the art will recognize that changes may be made in form and detail without departing prom the spirit and scope of the invention. For example, the present invention can be used to treat various types of oils and liquid fuels prior to combustion in order to reduce or eliminate the generation of hazardous or otherwise unwanted gases, such as sulphur oxides, during combustion.

What is claimed is:

1. A method of decomposing a compound in a fluid, the method comprising:
   a) passing the fluid along a first surface discharge electrode in a pretreatment non-thermal plasma reactor, wherein the first surface discharge electrode comprises a first discharge surface with a first set of conductors with alternating polarity along the first discharge surface;
   b) electrically exciting the first surface discharge electrode to generate a first surface plasma in the fluid along the first surface discharge electrode;
   c) removing solid compounds produced from the fluid in step b) within the pretreatment plasma reactor through a solid compound outlet;
   d) passing the fluid through a gap between second and third oppositely polarized volume discharge electrodes in a main non-thermal plasma reactor; and
   e) electrically exciting the second and third oppositely polarized volume discharge electrodes to generate a second plasma in the fluid across the gap.

2. The method of claim 1 wherein the pretreatment non-thermal plasma reactor further comprises a housing and a tubular electrode support within the housing which supports the first surface discharge electrode on an outer diameter surface thereof, and wherein step a) comprises:
   passing the fluid through an internal cavity of the housing, between the housing and the outer diameter of the tubular electrode support.

3. The method of claim 2 wherein step a) further comprises passing the fluid circumferentially along the outer diameter surface of the tubular electrode support.

4. The method of claim 2 wherein the first and second conductors are wound together around the outer diameter surface of the tubular electrode support and wherein step a) further comprises electrically isolating the first and second conductors from one another and the fluid.

5. The method of claim 2 wherein step a) further comprises:
   a) 1) positioning a scrubber within the housing such that it contacts the first surface discharge electrode; and
   a) 2) moving one of the tubular electrode support and the scrubber relative to the other such that the dust scrubber scrubs solid compounds produced from the fluid and collected of the first surface discharge electrode.

6. The method of claim 5 wherein step a) 2) comprises rotating the tubular electrode support about a central axis.

7. The method of claim 5 wherein step c) comprises positioning the solid compound outlet within the housing at a location beneath the scrubber.

8. The method of claim 1 wherein the pretreatment non-thermal plasma reactor further comprises a plurality of surface discharge electrodes, including the first surface discharge electrode, which are arranged parallel to one another, wherein each surface discharge electrode is planar, and wherein step a) comprises:
   a) 1) passing the fluid along a plurality of flow paths which extend in a common direction between respective pairs of the plurality of surface discharge electrodes.

9. The method of claim 8 wherein the pretreatment non-thermal plasma reactor further comprises a housing, wherein the plurality of surface discharge electrodes extend vertically within the housing and wherein step c) comprises:
   c) 1) positioning the solid compound outlet beneath the plurality of surface discharge electrodes such that the plurality of flow paths is open to the solid compound outlet.

10. The method of claim 9 wherein step c) further comprises:
   c) 2) sliding a latch between a plurality of selectable positions, wherein the latch blocks a first set of the plurality of flow paths and unblocks a second set of the plurality of flow paths in each of the selectable positions, and the first and second sets are different in each of the selectable positions.

11. The method of claim 10 wherein step c) further comprises:
   c) 3) temporarily increasing a voltage applied to the surface discharge electrodes adjacent to the blocked first set of flow paths when the latch is in each of the selectable positions.

12. The method of claim 1 wherein in step d) the second and third electrodes are parallel to one another and each comprises a conductive plate and a dielectric barrier that is positioned between the conductive plate and the gap.

13. The method of claim 1 wherein in step d) the second and third volume discharge electrodes are parallel to one another and each comprises a conductive mesh and a dielectric barrier that is positioned between the conductive mesh and the gap.

14. The method of claim 1 wherein in step c) the main non-thermal plasma reactor further comprises:
   a housing;
   a plurality of parallel, planar volume discharge electrode plates, including the second and third volume discharge electrodes, which extend vertically within the housing and are arranged to define a winding flow path, wherein adjacent ones of the plurality of planar volume discharge electrode plates have opposite polarity; and
   a plurality of reaction volumes which are defined within the winding flow path between respective pairs of the plurality of planar electrode plates.

15. The method of claim 14 and further comprising:
   f) removing solid compounds produced from the fluid in step e) through a further solid compound outlet positioned below the plurality of reaction volumes.

16. The method of claim 1 wherein in step d) the main non-thermal plasma reactor further comprises:
   a plurality of planar high voltage electrode plates, wherein the second volume discharge electrode is one of the high voltage electrode plates;
   a plurality of planar ground electrode plates which are parallel to and interleaved with the plurality of high voltage electrode plates, wherein the third volume discharge electrode is one of the ground electrode plates; and
   a plurality of parallel flow paths which extend between respective pairs of the plurality of high voltage and ground electrode plate.

17. The method of claim 16 wherein in step d) each planar ground electrode plate comprises a wire mesh which provides a fluid flow path through the wire mesh.

18. A method of decomposing a fluid comprising dust, sulfur oxide and nitrogen oxide, the method comprising:
   a) passing the fluid along a first surface discharge electrode in a pretreatment non-thermal plasma reactor, wherein the first surface discharge electrode comprises a first discharge surface with a first set of conductors having alternating polarity;
   b) electrically exciting the first surface discharge electrode to generate a first surface plasma in the fluid along the first surface discharge electrode to thereby remove a first portion of the dust and decompose a first portion of the sulfur oxide and nitrogen oxide from the fluid;

c) removing the first portion of the dust from the pretreatment plasma reactor through a solid compound outlet;

d) passing the fluid through a gap between second and third oppositely polarized volume discharge electrodes in a main non-thermal plasma reactor; and e) electrically exciting the second and third oppositely polarized volume discharge electrodes to generate a second plasma in the fluid across the gap and thereby remove a second portion of the dust and decompose a second portion of the sulfur oxide and nitrogen oxide.

* * * * *

UNITED STATES PATENT AND TRADEMARK OFFICE
CERTIFICATE OF CORRECTION

PATENT NO. : 6,565,716 B1
DATED : May 20, 2003
INVENTOR(S) : Ruan et al.

It is certified that error appears in the above-identified patent and that said Letters Patent is hereby corrected as shown below:

Column 3,
Line 57, after "decompose" change ". Sulphur" to -- , sulphur --.

Signed and Sealed this

Thirteenth Day of April, 2004

JON W. DUDAS
*Acting Director of the United States Patent and Trademark Office*